United States Patent
Ghosh et al.

Patent Number: 6,018,667
Date of Patent: Jan. 25, 2000

[54] METHOD AND APPARATUS FOR TRANSMITTING INFORMATION REGARDING THE SYNCHRONIZATION STATUS OF A BASE STATION

[75] Inventors: Amitava Ghosh, Vernon Hills; Gerald Paul Labedz, Chicago; Kenneth Allen Haas, Sleepy Hollow, all of Ill.

[73] Assignee: Motorola, Inc., Schaumburg, Ill.

[21] Appl. No.: 09/009,403

[22] Filed: Jan. 20, 1998

[51] Int. Cl.⁷ .......................... H04B 7/005; H04B 7/216; H04B 15/00

[52] U.S. Cl. .......................... 455/502; 370/335; 375/206; 375/200

[58] Field of Search ........................ 455/502, 524, 455/525, 519, 503, 454, 38.1, 522, 517; 370/335, 342, 350, 503, 913, 320; 375/354, 356, 206, 358

[56] References Cited

U.S. PATENT DOCUMENTS

| | | | |
|---|---|---|---|
| 5,164,958 | 11/1992 | Omura | 375/206 |
| 5,487,083 | 1/1996 | Nakajima et al. | 375/200 |
| 5,519,759 | 5/1996 | Heineck et al. | 455/502 |
| 5,613,211 | 3/1997 | Matsuno | 370/350 |
| 5,703,873 | 12/1997 | Ojanpera et al. | 370/335 |
| 5,737,330 | 4/1998 | Fulthorp et al. | 455/525 |
| 5,784,368 | 7/1998 | Weigand et al. | 455/502 |
| 5,799,004 | 8/1998 | Keskitalo et al. | 370/335 |
| 5,828,659 | 10/1998 | Teder et al. | 455/67.6 |
| 5,872,774 | 2/1999 | Wheatley, III et al. | 370/335 |
| 5,910,948 | 6/1999 | Shou et al. | 370/335 |

OTHER PUBLICATIONS

ANSI–J–STD–008, Section 7.7.7.3.2.3.
Fast Cell Search Algorithm in DS–CDMA Mobile Radio Using Long Spreading Codes, by Higuchi, et al.

*Primary Examiner*—Dwayne D. Bost
*Assistant Examiner*—Tracy M. Legree
*Attorney, Agent, or Firm*—Kenneth A. Haas

[57] ABSTRACT

Base stations (101, 102) utilize a spreading code that is dependent upon whether the particular base station (101) is operating in a synchronized, or an unsynchronized mode. Unsynchronized base stations (102) within the communication system (100) utilize a long code unique to the particular base station (102), and base stations (101) operating in a synchronized mode utilize a time shifted version of the same long code. To reduce the search time for remote units (113) within the communication system (100), a group identification code (GIC) (305) is broadcast during a time period that the long code is masked. The GIC (305) indicates a (spreading code) long code group to which the long code of each base station belongs. Additionally, each base station (101, 102) within the communication system (100) determines its synchronization status and utilizes a particular GIC (305) and long code based on the base station's synchronization status.

13 Claims, 4 Drawing Sheets

METHOD AND APPARATUS FOR TRANSMITTING INFORMATION REGARDING THE SYNCHRONIZATION STATUS OF A BASE STATION

FIELD OF THE INVENTION

The present invention relates generally to cellular communication systems and, in particular, to a method and apparatus for transmitting information regarding the synchronization status of a base station.

BACKGROUND OF THE INVENTION

Existing direct sequence spread spectrum cellular communication system protocols require base stations within the communication system to be time synchronized. For example, within a wireless communication system utilizing a Code Division Multiple Access (CDMA) system protocol, it is desirable to have all base stations within the communication system synchronized to +/−3 microseconds ($\mu s$), and it is mandatory that all base stations within the communication system be synchronized to at least to +/−10 $\mu s$. Synchronization occurs within a CDMA system as described in "Personal Station-Base Station Compatibility Requirements for 1.8 to 2.0 GHz Code Division Multiple Access (CDMA) Personal Communication Systems" (American National Standards Institute (ANSI) J-STD-008). In particular, all base stations reference a common CDMA system-wide time scale that uses Global Positioning System (GPS) time. All base stations utilize the same pseudo-noise (PN) spreading code (long code), but with different time offsets. A remote unit uses a correlator to detect the presence of the PN code, and will detect all base stations in the geographic region if it searches the entire length of the single PN code. In the described system, the base stations are offset from each other by integer multiples of 64 PN chips, thus allowing 512 unique offsets of the length $2^{15}$ or 32,768 chips. A major advantage in having all base stations within a communication utilize a common system time, is that when acquiring a base station, the remote unit only need to look within a very small time window around a nominal PN offset to acquire the new base station.

Since GPS is not visible everywhere (i.e., subways and dense urban environments), and to reduce the backhaul costs, some current CDMA developers are proposing that base stations within next-generation CDMA systems be unsynchronized. An example of an unsynchronized next-generation CDMA system is that proposed in "Fast Cell Search Algorithm in DS-CDMA Mobile Radio Using Long Spreading Codes" by K. Higuchi et al., VTC-97, pp. 1430–1434. In this proposal, all base stations operate in an unsynchronized fashion, each having a unique long code and a common short code. The base station primarily transmits a product of the two codes, but at defined times will mask the long code and transmit only the short code. Thus a remote unit may search for the common short code and get a periodic strong match from a strong base station, and a periodic weaker match from a weaker base station. Higuchi et al. describes a process for the mobile to first detect short codes, then determine the long code phase, a long code group identification, and then the long code identification along with the frame timing. A mobile in communication with one base station must continually search for the presence of nearby base stations using this same process, since all base stations within the system are unsynchronized and cannot communicate timing information to the remote units to reduce their search. Because of this, remote units handing off within an unsynchronized system will need to look within a larger code space to acquire a new base station. Since there currently exists no method to determine whether a communication system is synchronized or not, remote units handing off within next-generation CDMA systems will be required to search a larger code space (for asynchronous base stations) and time window (for synchronous base stations) when handing off, even if the base stations are time synchronized, resulting in unnecessarily long handoff times.

It is desirable to have synchronized base stations for fast acquisition, yet allow the system to operate in geographic areas where accurate time synchronization is unavailable, or continue to operate when time synchronization fails. In order to accomplish this task, a remote unit must know beforehand whether a particular base station is operating in a synchronized or an unsynchronized mode so that the remote unit can vary its searching technique accordingly. Therefore, a need exists for a method and apparatus for transmitting information regarding the synchronization status of a base station to a remote unit so that the remote unit can vary its searching technique accordingly.

DETAILED DESCRIPTION OF THE DRAWINGS

Figure 1:
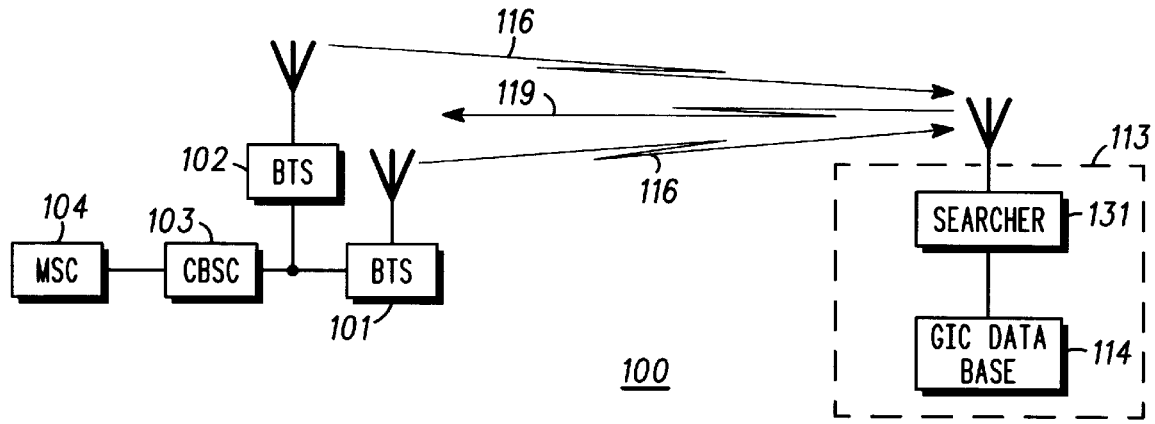
FIG. 1 is a block diagram of a wireless communication system in accordance with the preferred embodiment of the present invention.

Stated generally, base stations within a communication system utilize a spreading code that is dependent upon whether the particular base station is operating in a synchronized, or an unsynchronized mode. Unsynchronized base stations within the communication system utilize a long code unique to the particular base station, and base stations operating in a synchronized mode utilize a time shifted version of the same long code. To reduce the search time for remote units within the communication system, a group identification code (GIC) is broadcast during a time period that the long code is masked by a common short code. The GIC is selected from a subset of 64 ary Walsh code or Orthogonal Gold code. The GIC indicates a long code (spreading code) group to which the long code of each base station belongs. Additionally, each base station within the communication system determines its synchronization status and utilizes a particular GIC and long code based on the base station's synchronization status. By analyzing GIC information, remote units acquiring base stations know beforehand whether a particular base station is operating in a synchronized or an unsynchronized mode, and can vary their searching algorithm based on the base station's synchronization status. This allows remote units to operate with synchronized base stations yet be able to operate in geographic areas where accurate time synchronization is unavailable, or continue to operate when time synchronization fails.

The present invention encompasses a method for transmitting information regarding the synchronization status of a base station. The method comprises the steps of determining if a base station is operating in a synchronized mode or an unsynchronized mode and transmitting a first group identification code (GIC) to a remote unit if the base station is operating in a synchronized mode, otherwise transmitting a second GIC to the remote unit if the base station is operating in an unsynchronized mode. In the preferred embodiment of the present invention the GIC indicates a spreading code group to which a spreading code utilized by the base station belongs.

The present invention additionally encompasses a method for transmitting information regarding the synchronization status of a neighboring base station. The method comprises determining, by a first base station, a synchronization status of the neighboring base station and transmitting a neighbor list message to a remote unit, the neighbor list comprising a group identification code (GIC) corresponding to the neighbor base station. As discussed above, the GIC indicates a spreading code group to which a spreading code utilized by the neighbor base station belongs.

Finally, the present invention encompasses an apparatus for transmitting information regarding the synchronization status of a base station in a Code Division, Multiple Access (CDMA) communication system. The apparatus comprises a controller for determining if a base station is operating in a synchronized mode or an unsynchronized mode; and spreading circuitry, coupled to the controller, for spreading modulated data with a spreading code. In the preferred embodiment of the present invention, the spreading code determined based on the synchronization status of the base station.

FIG. 1 is a block diagram of a wireless communication system in accordance with the preferred embodiment of the present invention. In the preferred embodiment of the present invention, communication system 100 utilizes a CDMA system protocol as described in ANSI J-STD-008. However, in alternate embodiments communication system 100 may utilize other digital cellular communication system protocols such as, but not limited to, the next-generation CDMA protocols, including direct sequence spread spectrum or slow frequency hopping spread spectrum systems. Communication system 100 includes base station 101, base station 102, remote unit 113, Centralized Base Station Controller (CBSC) 103, and Mobile Switching Center (MSC) 104. In the preferred embodiment of the present invention base stations 101 and 102 are preferably Motorola SC9600 base stations, MSC 104 is preferably a Motorola EMX2500 MSC, and CBSC 103 is preferably comprised of a Motorola SG1128BF CBSC component. As shown, remote unit 113 is communicating with base stations 101 and 102 via uplink communication signals 119 and base stations 101 and 102 are communicating with remote unit 113 via downlink communication signals 116. In the preferred embodiment of the present invention, base stations 101 and 102 are suitably coupled to CBSC 103, and CBSC 103 is suitably coupled to MSC 104.

Operation of communication system 100 occurs as follows: Base stations within communication system 100 continuously broadcast a control channel (via downlink communication signal 116) that is utilized by remote unit 113 in accessing communication system 100. Once remote unit 113 has determined a base station having a strongest control channel (in this case, base station 101), remote unit uses the timing of the control channel to time align to base station 101. In particular, as described in "Fast Cell Search Algorithm in DS-CDMA Mobile Radio Using Long Spreading Codes" by K. Higuchi et al., and incorporated by reference herein, a fast cell search algorithm based on periodic long code masking is utilized by remote unit 113 to time align to base station 101. As described by Higuchi et al., a common short code (CSC) is periodically masked over the long code. Remote unit 113 exploits the fact that the CSC periodically appears in the long code to detect the phase of the long code.

Unlike prior art methods of long code utilization, in the preferred embodiment of the present invention the particular long code utilized by base stations within communication system 100 is dependent upon whether the particular base station is operating in a synchronized, or an unsynchronized mode. In particular, unsynchronized base stations within communication system 100 utilize a long code unique to the particular base station, and base stations operating in a synchronized mode utilize a time shifted version of the same long code. During acquisition, remote unit 113 uses searcher 131 to detect the presence of a particular long code, where a single time shifted long code is utilized for all synchronized base stations, and a plurality of long codes are utilized for unsynchronized base stations within communication system 100. For synchronized base stations, remote unit 113 will detect all synchronized base stations in the geographic region if it searches the entire length of the single long code. In the preferred embodiment, synchronized base stations are time offset from each other by integer multiples of 64 PN chips, thus allowing greater than 512 unique offsets of the 40,960 chips. For unsynchronized base stations, remote unit 113 will detect all unsynchronized base stations in the geographic area if all long codes utilized by the unsynchronized base stations are searched. In the preferred embodiment of the present invention, 511 specific long codes are utilized by the unsynchronized base stations within communication system 100.

To reduce the search time for remote units within communication system 100 (i.e., to avoid searching through every single long code), a group identification code (GIC) is broadcast during a time period that the long code is masked. The GIC indicates a long code (spreading code) group to which the long code of each base station belongs. Additionally, each base station within communication system 100 determines its synchronization status (i.e., synchronized or unsynchronized), and utilizes a particular GIC and long code based on the base station's synchronization status. As indicated above, 512 specific long codes are utilized. Remote units within communication system 100 will receive the GIC transmitted from a particular base station and access GIC database 114 to determine if a particular GIC belongs to a synchronized or an unsynchronized base station. For example, if base stations within communication system 100 are utilizing a particular GIC to identify synchronized base stations (e.g., GIC__16), then all remote units within communication system 100 will have prior knowledge (via internal storage 114) that if GIC__16 is detected, the GIC was transmitted from a synchronized base station. In the preferred embodiment of the present invention, the number of GICs are 16, where 32 long codes belong to GICs 1–15, and a single long code (for synchronized base stations) belongs to GIC 16.

In the preferred embodiment of the present invention remote unit 113 searches for a particular base station as described by Higuchi et al. during an initial scan. More particularly, the long code phase of the best cell site is detected using a CSC masked filter. Next the long code GIC is identified by taking the cross-correlation between the received signal with all GIC candidates. Finally, all possible long code candidates belonging to the particular GIC are searched. The frame timing is also derived at this step. Unlike prior art search algorithms, remote unit 113 varies its searching technique based on the particular GIC received. For example, if remote unit 113 identifies the particular GIC as belonging to a group of synchronized base stations, then remote unit 113 utilizes searcher 131 and searches the relevant time offsets for a single long code. If, however, remote unit 113 identifies the particular GIC as belonging to a group of unsynchronized base stations, then remote unit 113 utilizes searcher 131 to search all possible long code candidates belonging to the particular GIC.

Additionally, as described in J-STD-008, remote unit 113 may be placed into simultaneous communication with more than one base station, which is termed "softer handoff" or "soft handoff" when the base stations are co-located or not, respectively. Thus, soft handoff requires remote unit 113 to perform additional searching for neighbor base stations. In order to reduce searching time for remote units in soft handoff, base station 101 provides a list of neighboring base stations (neighbor list) for soft-handoff purposes. Such a neighbor list is described in detail in J-STD-008 section 7.7.2.3.2.3. However, unlike prior-art methods of supplying neighbor lists to remote units, in the preferred embodiment of the present invention the neighbor list contains the GIC for the particular neighbor base stations, and additionally, contains time offset information (PN offset) for synchronized neighbor base stations only or the long code information for asynchronous base stations. Remote unit 113 will utilize this information and acquire additional base stations (via the acquisition procedure discussed above) to simultaneously communicate with serving base station 101 and monitor all acquired base stations.

Table 1 shows a modified Neighbor List Message in accordance with the preferred embodiment of the present invention. In the preferred embodiment of the present invention, the modified Neighbor List Message is a variable bit message broadcast to remote unit 113 over a standard paging channel and is similar to the Neighbor List Message described in J-STD-008 section 7.7.2.3.2.3 except for the following field changes:

PILOT_PN_SYN Pilot PN sequence offset index.

For synchronized base stations, the base station shall set this field to the pilot PN sequence offset for this base station, in units of 64 PN chips. For unsynchronized base stations, the base station shall set this field to zero.

LC_ASYN Long Code ID

For unsynchronized base stations, the base station shall set this field to the LC ID for this base station. For synchronous base stations, the base station shall set this field to zero.

PILOT_INC_SYN: Pilot PN sequence offset index increment.

Set as described in J-STD-008 except if all neighboring base stations are operating in an unsynchronized mode, set to zero.

GIC: GIC for neighbor base station

LC_OR_PNFFSET: Neighbor base station PN offset (if synchronized) or neighbor base station long code (if unsynchronized)

If the neighbor base station is synchronized, the base station shall set this field to the pilot PN sequence offset for this neighbor, otherwise the base station shall set this field to the long code being utilized by the asynchronous neighbor base station.

| Field | Length (bits) |
|---|---|
| MSG_TYPE ('00000011') | 8 |
| PILOT_PN_SYN | 9 |
| CONFIG_MSG_SEQ | 6 |
| LC_ASYN | 9 |
| PILOT_INC_SYN | 4 |

TABLE 1

Modified Neighbor List Message

The following fields are repeated for each neighbor base station

| | |
|---|---|
| GIC | 5 |
| NGHBR_CONFIG | 3 |
| PN_OR_TOFFSET | 9 |
| RESERVED | 0–7 (as needed) |

As discussed above, it is desirable to have synchronized base stations for fast acquisition, yet allow the system to operate in geographic areas where accurate time synchronization is unavailable, or continue to operate when time synchronization fails. By analyzing GIC information, remote units acquiring base stations know beforehand whether a particular base station is operating in a synchronized or an unsynchronized mode, and can vary their searching algorithm based on the base station's synchronization status. This allows remote units to operate with synchronized base stations yet be able to operate in geographic areas where accurate time synchronization is unavailable, or continue to operate when time synchronization fails.

Figure 2:
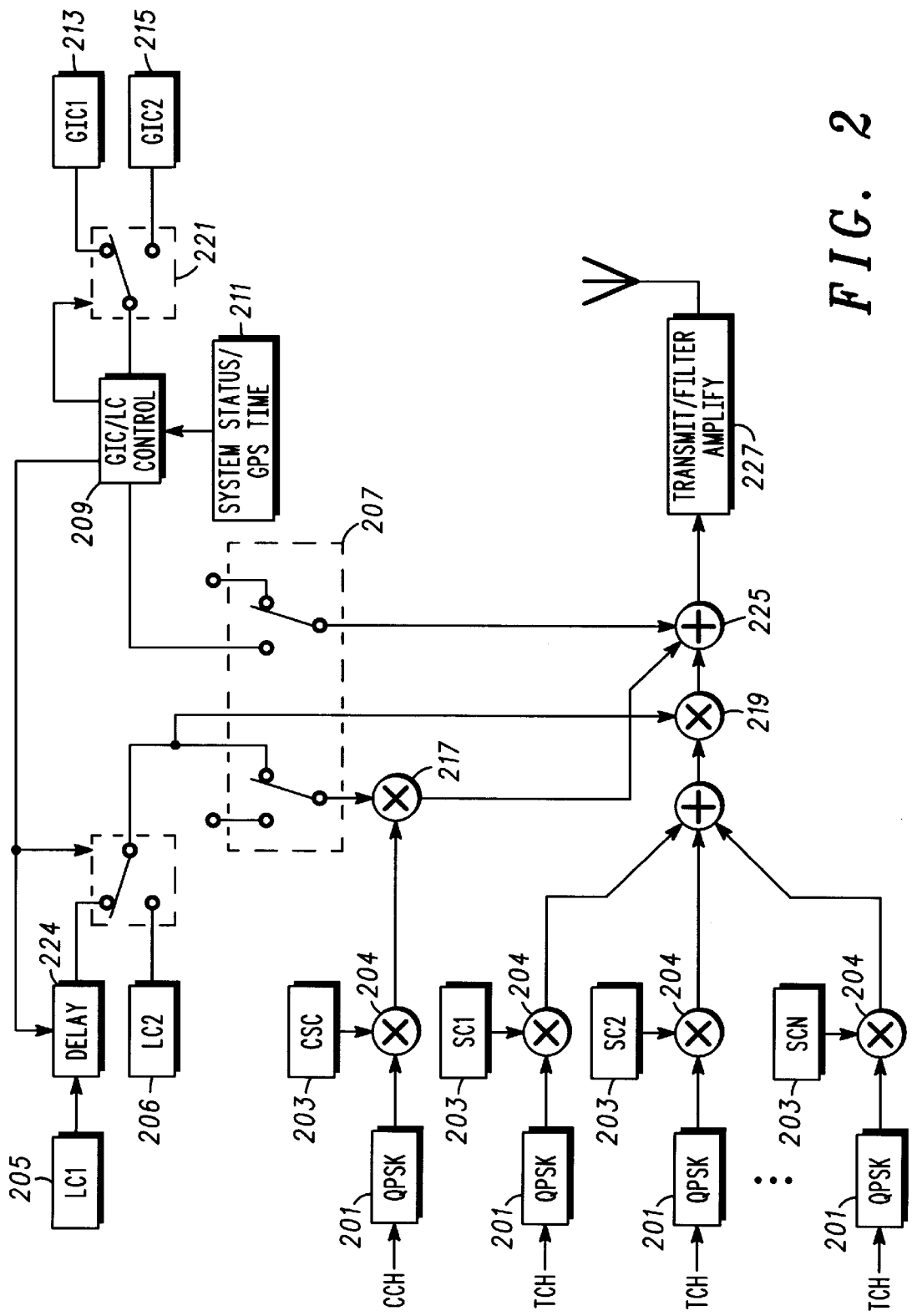
FIG. 2 is a block diagram of a base station of FIG. 1 in accordance with the preferred embodiment of the present invention.

FIG. 2 is a block diagram of base stations 101, 102 of FIG. 1 in accordance with the preferred embodiment of the present invention. Base station 101, 102 comprises a plurality of quadrature phase shift keyed (QPSK) modulators 201, a plurality of spreading generators 203, long code generators 205 and 206, switching circuitry 207, GIC control 209, system status supply 211, and multiple GICs 213–215. During operation traffic channel or control channel data enters QPSK modulators 201 and is appropriately modulated and output to spreading circuitry 204. Spreading circuitry 204 appropriately spreads the QPSK modulated data with a short spreading code generated by spreading code generators 203. In particular, spreading circuitry 204 modulo 2 adds an orthogonal code (e.g., an orthogonal word) to each data symbol. These orthogonal codes preferably correspond to Walsh codes from a 64 by 64 Hadamard matrix wherein a Walsh code is a single row or column of the matrix or a 64 ary Orthogonal Gold Code. In the preferred embodiment of the present invention the spreading code utilized for the CCH is the CSC, that is common to all base stations within communication system 100.

Continuing, appropriately spread control channel data and traffic channel data are further spread by a spreading circuitry 217 and 219 respectively. In the preferred embodiment of the present invention spreading circuitry 217 and 219 further spreads control channel and traffic channel data with a unique long code supplied by either long code generator 205 or long code generator 206. The particular long code utilized by spreaders 217 and 219 is chosen based on the current base station status (i.e., synchronized or unsynchronized). More particularly, GIC/LC control 209 analyzes the current system status (supplied by system status unit 211) and switches between LC1 205 and LC2 206 based on the base station synchronization status. As discussed above, unsynchronized base stations within communication system 100 utilize 511 individual long codes, while the synchronized base stations within communication system 100 utilize a single, time shifted long code. GIC/LC control 209 determines the current system status, and if the current system status is "synchronized," then GIC/LC control 209 instructs switching circuitry 222 to supply a first long code (LC1, where LC1 is the single long code utilized by synchronized base stations) to spreading circuitry 217, 219. Additionally, during synchronized operation GICILC control is supplied a "time offset" for LC1 and delays LC1 (via delay circuitry 224) accordingly. The appropriate system time is GPS time supplied by system status unit 211. If GIC/LC control 209 determines that the current system status is "unsynchronized," then GIC/LC control 209 supplies a second long code (LC2, where LC2 is chosen from the group of 511 long codes used for unsynchronized systems) to spreading circuitry 217, 219. After further spreading by spreading circuitry 217, 219, the resultant signals are summed by summing circuitry 225, filtered by a transmit filter and amplified by a linear power amplifier 227, and transmitted to remote unit 113.

As discussed above, for control channel transmission, the long code sequence is periodically masked over one data symbol interval (short code length) allowing the CSC to periodically appear M times in each long code period. The masking is accomplished by switching circuitry 207. In particular, when switch 207 is "open," no long code is supplied to spreading circuitry 217, allowing only the unspread CSC to be input into summing circuitry 225. As discussed above, remote units 113 within communication system 100 exploit the fact that the GIC periodically appears in the long code to narrow the search range of the long code. During the time period when the CSC is unspread, a GIC is supplied to summing circuitry 225 to be amplified (by amplifier 227) and transmitted to remote units 113 within communication system 100. Unlike prior art methods of GIC transmission, GIC/LC control 209 determines a particular GIC to transmit based on the current system status. In particular, if GIC/LC control 209 determines that the current system status is "synchronized," then GIC/LC control 209 instructs switching circuitry 221 to supply a first GIC (GICI) to summing circuitry 225. If GIC/LC control 209 determines that the current system status is "unsynchronized," then GIC/LC control 209 supplies a second GIC (GIC2) to summing circuitry 225. As discussed above, to avoid searching through every single long code, the GIC is broadcast indicating a long code group to which the long code of each base station belongs.

Figure 3:
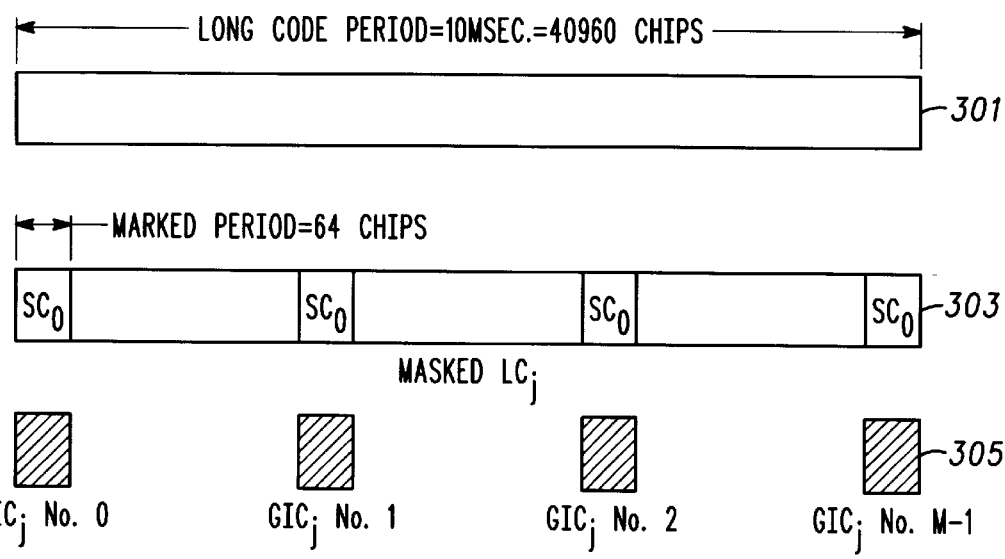
FIG. 3 is an illustration of signals transmitted from a base station of FIG. 1 in accordance with the preferred embodiment of the present invention.

FIG. 3 is an illustration of signals transmitted from a base station of FIG. 1 in accordance with the preferred embodiment of the present invention. During the transmission of LC1 or LC2 (represented by signal 301), switching circuitry 207 periodically opens, ceasing transmission of LC1 or LC2. The resulting signal (shown as signal 303) has the CSC periodically appearing during each long code period. During the times when CSC periodically appears, GIC1 or GIC2 is transmitted (signal 305) from base stations 101, 102.

Figure 4:
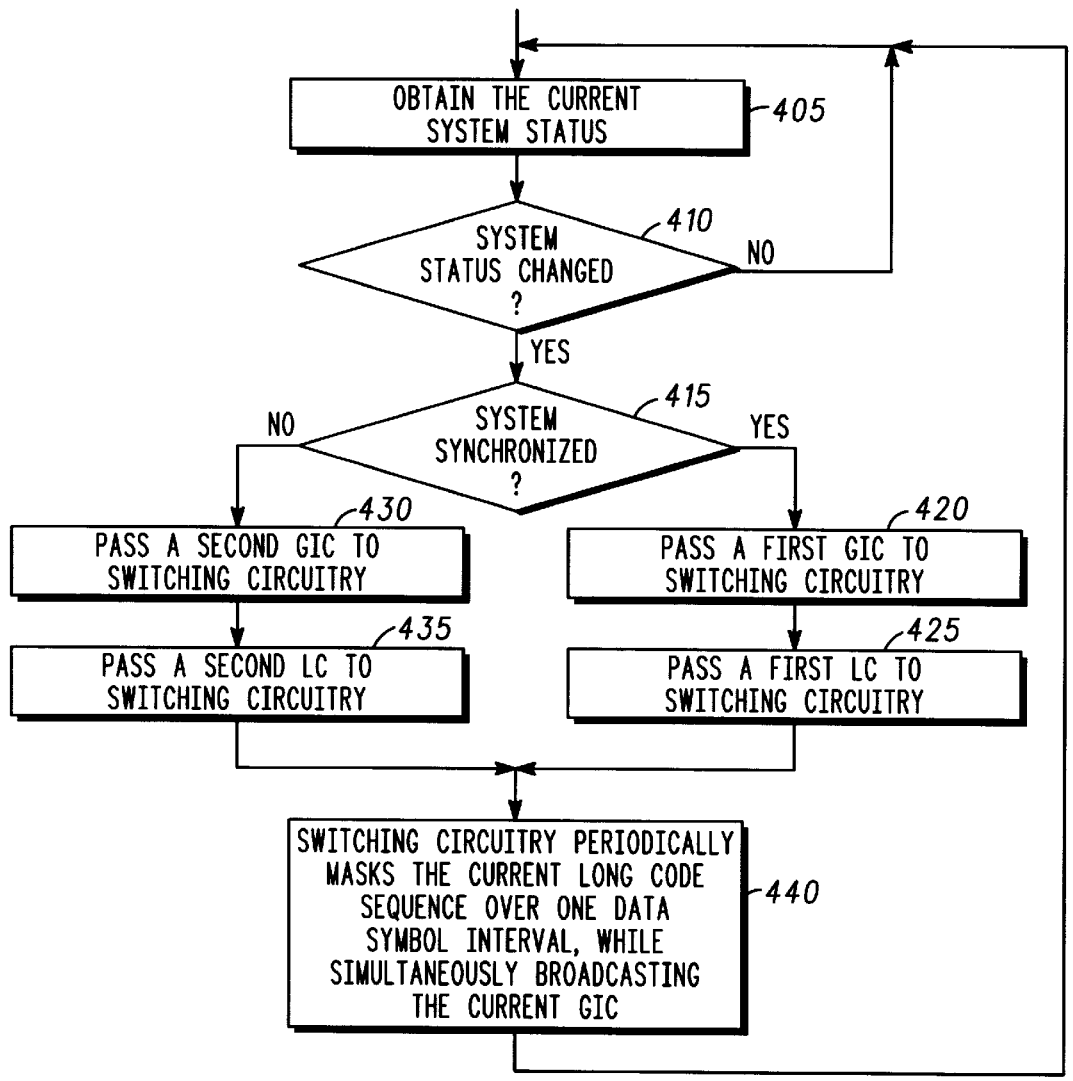
FIG. 4 is a flow chart showing operation of the base station of FIG. 1 in accordance with the preferred embodiment of the present invention.

FIG. 4 is a flow chart showing operation of the base station of FIG. 1 in accordance with the preferred embodiment of the present invention. The logic flow begins at step 405 where GIC/LC control 209 obtains the current system status and GPS time. In particular, GIC/LC control 209 is supplied the current system status (synchronized/unsynchronized) by system status/GPS time supply 211. Next, at step 410 GIC/LC control 209 determines if the system status has changed. If, at step 410 GIC/LC control 209 determines that the system status has changed (i.e., synchronized to unsynchronized or unsynchronized to synchronized) then the logic flow continues to step 415, otherwise the logic flow returns to step 405. At step 415 GIC/LC control 209 determines if the base station is operating in a synchronized mode, and if so, the logic flow continues to step 420. At step 420 GIC/LC control 209 manipulates switching circuitry 221 to pass a first GIC to switching circuitry 207. In particular, at step 420 switching circuitry 221 passes GIC1 to switching circuitry 207. Next, at step 425, GIC/LC control 209 manipulates switching circuitry 222 to pass a first long code (LC1) to switching circuitry 207. In addition, at step 425 GIC/LC control appropriately delays (via delay circuitry 224) the first long code a predetermined amount for proper base station identification. The logic flow continues to step 440.

Returning to step 415; if GIC/LC control 209 determines that the base station is not operating in a synchronized mode the logic flow continues to step 430 where switching circuitry 221 passes a second GIC (GIC2) to switching circuitry 207. Next, at step 435, GIC/LC control 209 manipulates switching circuitry 222 to pass a second long code (LC1) to switching circuitry 207. The logic flow continues to step 440. At step 440 switching circuitry 207 periodically masks the current long code sequence over one data symbol interval, while simultaneously broadcasting the current GIC.

Supplying the current GIC in such a way to indicate whether the base station is operating in a synchronized or an unsynchronized mode allows remote units acquiring base stations to vary their searching algorithm based on the communication system's synchronization status. Thus remote units will vary their searching algorithm based on the base station's synchronization status, allowing remote units to operate with synchronized base stations yet be able to operate in geographic areas where accurate time synchronization is unavailable, or continue to operate when time synchronization fails.

Figure 5:
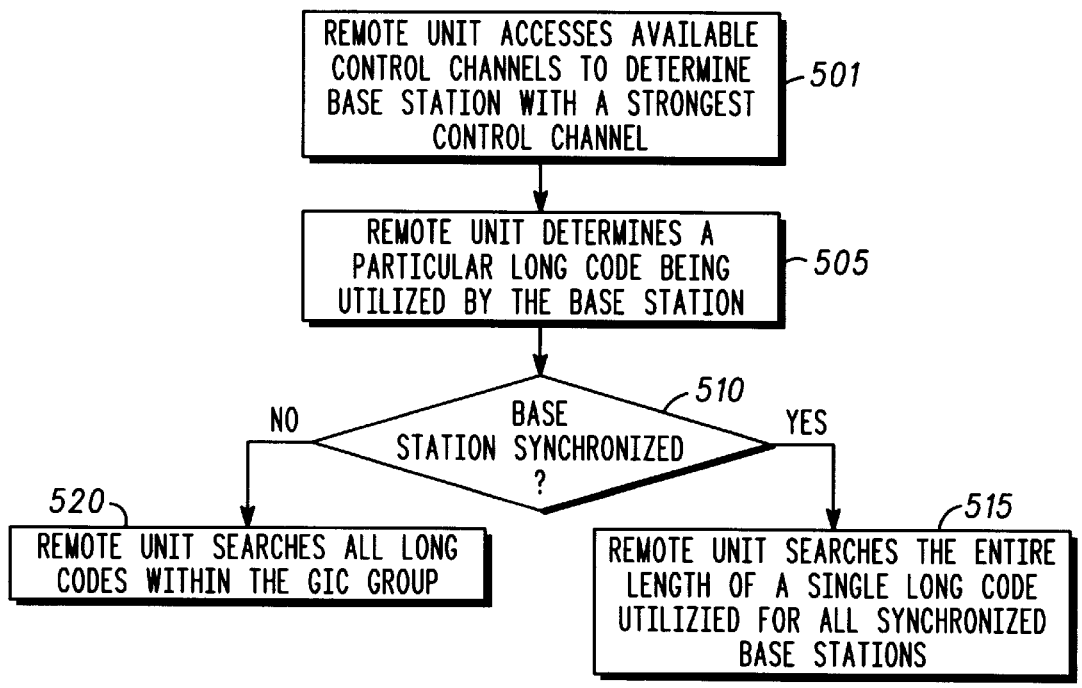
FIG. 5 is a flow chart showing operation of the remote unit of FIG. 1 in accordance with the preferred embodiment of the present invention.

FIG. 5 is a flow chart illustrating operation of the remote unit of FIG. 1 in accordance with the preferred embodiment of the present invention. The logic flow begins at step 501 where remote unit 113 accesses available control channels (CCHs) to determine a base station with a strongest control channel. In the preferred embodiment of the present invention, base stations within communication system 100 continuously broadcast a control channel (via downlink communication signal 116) that is utilized by remote unit 113 in accessing communication system 100. Once remote unit 113 has determined a base station having a strongest control channel (in this case, base station 101), the logic flow continues to step 505 where remote unit determines a particular long code being utilized by base station 101. As discussed above, remote unit 113 detects the long code timing by searcher 131. Searcher 131 searches for the periodically appearing CSC masked over the long code to determine the phase of the long code. Once the long code phase has been detected, searcher 131 receives the GIC, indicating the group of long codes (e.g., group 1 (GIC1)) to which the base station's long code belongs. The logic flow continues to step 510 where searcher 131 accesses GIC data base 114 to determine if base station 101 is operating in a synchronized mode. If at step 510, remote unit 113 determines that base station 101 is operating in a synchronized mode, then the logic flow continues to step 515 where remote unit 113 searches the entire length of a single long code utilized for all synchronized base stations within communication system 100. If at step 510 remote unit 113 determines that base station 101 is not operating in a synchronized mode, then the logic flow continues to step 520 where all long codes within the GIC group are searched followed by frame timing detection. In the preferred embodiment of the present invention, this is accomplished by searching all 32 long codes belonging to the particular GIC group (GIC1).

The descriptions of the invention, the specific details, and the drawings mentioned above, are not meant to limit the scope of the present invention. For example, in addition to grouping GICs based on synchronization status, GICs may be grouped to indicate other communication system parameters. Additionally, although the preferred embodiment was described utilizing a single GIC for all synchronized base stations, if the number of synchronized base stations within the communication system exceeds 32, then multiple GICs can be utilized to identify synchronized base stations. It is the intent of the inventors that various modifications can be made to the present invention without varying from the spirit and scope of the invention, and it is intended that all such modifications come within the scope of the following claims.

What is claimed is:

1. A method for transmitting information regarding a synchronization status of a base station, the method comprising the steps of:

determining if the base station is operating in a synchronized mode or an unsynchronized mode to produce a synchronization determination; and transmitting a group identification code (GIC) to a remote unit, wherein the GIC is chosen based on the synchronization determination such that if the base station is operating in the synchronized mode a first GIC is transmitted, otherwise a second GIC is transmitted to the remote unit if the base station is operating in the unsynchronized mode, wherein the GIC indicates a spreading code group to which a spreading code utilized by the base station belongs.

2. The method of claim 1 further comprising the steps of:

choosing the spreading code based on the synchronization determination; and spreading modulated data with the spreading code.

3. The method of claim 2 wherein the step of choosing the spreading code further comprises the step of choosing the spreading code wherein the spreading code is a time shifted version of a single spreading code if the base station is synchronized, otherwise the spreading code is a spreading code chosen from a plurality of spreading codes.

4. The method of claim 1 wherein the step of transmitting the GIC comprises the steps of:

periodically masking a first spreading code with a second spreading code; and transmitting the first or the second GIC during a time period when the first spreading code is masked by the second spreading code.

5. A method for transmitting information regarding a synchronization status of a neighboring base station, the method comprising the steps of:

determining, by a first base station, the synchronization status of the neighboring base station;

transmitting a neighbor list message to a remote unit based on the synchronization status, the neighbor list message comprising a group identification code (GIC) corresponding to the neighbor base station, wherein the GIC indicates a spreading code group to which a spreading code utilized by the neighbor base station belongs.

6. The method of claim 5 wherein the step of transmitting further comprises the step of transmitting a time offset based on the synchronization status of the neighboring base station.

7. The method of claim 5 wherein the step of transmitting further comprises the step of transmitting a spreading code utilized by the neighbor base station, wherein the spreading code is determined based on the synchronization status of the neighboring base station.

8. A method for transmitting information regarding a synchronization status of a base station in a Code Division, Multiple Access (CDMA) communication system, the method comprising the steps of:

determining if the base station is operating in a synchronized mode or an unsynchronized mode to produce a synchronization determination;

determining a spreading code based on the synchronization determination;

spreading modulated data with the spreading code; and transmitting a first group identification code (GIC) to a remote unit if the base station is operating in the synchronized mode, otherwise transmitting a second GIC to the remote unit if the base station is operating in the unsynchronized mode, wherein the GIC indicates a spreading code group to which the spreading code utilized by the base station belongs.

9. The method of claim 8 wherein the step of transmitting the first and the second GIC comprises the steps of:

periodically masking the spreading code with a second spreading code; and transmitting the first or the second GIC during a time period when the first spreading code is masked by the second spreading code.

10. The method of claim 8 wherein the step of determining the spreading code further comprises the step of determining the spreading code wherein the spreading code is a time shifted version of a single spreading code if the base station is synchronized, otherwise the spreading code is a spreading code chosen from a plurality of spreading codes.

11. An apparatus for transmitting information regarding a synchronization status of a base station in a Code Division, Multiple Access (CDMA) communication system, the apparatus comprising:

a controller for determining if the base station is operating in a synchronized mode or an unsynchronized mode and outputting a synchronization determination; and spreading circuitry, coupled to the controller, for spreading modulated data with a spreading code, the spreading code determined based on the synchronization determination; and switching circuitry for switching between a first group identification code (GIC) and a second GIC based on whether the base station is operating in the synchronized or the unsynchronized mode, wherein the GIC indicates the spreading code group to which the spreading code utilized by the base station belongs.

12. The apparatus of claim 11 further comprising masking circuitry for periodically masking the spreading code with a second spreading code.

13. The apparatus of claim 11 wherein the spreading code is a time shifted version of a single spreading code if the base station is synchronized, otherwise the spreading code is a spreading code chosen from a plurality of spreading codes.

* * * * *